(12) United States Patent
Kim et al.

(10) Patent No.: US 11,643,093 B2
(45) Date of Patent: May 9, 2023

(54) METHOD FOR PREDICTING TRAFFIC LIGHT INFORMATION BY USING LIDAR AND SERVER USING THE SAME

(71) Applicant: Autonomous A2Z, Gyeongsan-si (KR)

(72) Inventors: Jung Dae Kim, Yongin-si (KR); Han Sol Kwon, Seongnam-si (KR); Young Chul Oh, Seongnam-si (KR)

(73) Assignee: Autonmous A2Z, Gyeongsan-si (KR)

( * ) Notice: Subject to any disclaimer, the term of this patent is extended or adjusted under 35 U.S.C. 154(b) by 0 days.

(21) Appl. No.: 17/532,301

(22) Filed: Nov. 22, 2021

(65) Prior Publication Data

US 2023/0098014 A1   Mar. 30, 2023

(30) Foreign Application Priority Data

Sep. 24, 2021  (KR) .................. 10-2021-0126771

(51) Int. Cl.
| | |
|---|---|
| *B60W 50/00* | (2006.01) |
| *B60W 40/10* | (2012.01) |
| *B60W 30/18* | (2012.01) |
| *G06V 20/58* | (2022.01) |
| *G08G 1/095* | (2006.01) |
| *B60W 30/095* | (2012.01) |

(52) U.S. Cl.
CPC .. *B60W 50/0097* (2013.01); *B60W 30/18154* (2013.01); *B60W 30/18159* (2020.02); *B60W 40/10* (2013.01); *G06V 20/584* (2022.01); *B60W 30/0956* (2013.01); *B60W 2420/52* (2013.01); *G08G 1/095* (2013.01)

(58) Field of Classification Search
None
See application file for complete search history.

(56) References Cited

U.S. PATENT DOCUMENTS

| | | | | |
|---|---|---|---|---|
| 9,922,259 | B2* | 3/2018 | Matsuo | G01C 21/26 |
| 9,990,548 | B2* | 6/2018 | Wellington | G06F 18/22 |
| 10,726,280 | B2* | 7/2020 | Wellington | G06V 20/56 |
| 10,789,491 | B2* | 9/2020 | Yamanoi | G06V 20/584 |
| 10,935,128 | B2* | 3/2021 | Jeon | F16H 61/0213 |
| 11,170,238 | B2* | 11/2021 | Gao | G01S 17/931 |
| 11,335,100 | B2* | 5/2022 | Lin | G06V 10/764 |

(Continued)

FOREIGN PATENT DOCUMENTS

| | | | |
|---|---|---|---|
| CN | 103500505 A | * | 1/2014 |
| CN | 103956057 A | * | 7/2014 |

(Continued)

*Primary Examiner* — Kevin R Steckbauer
(74) *Attorney, Agent, or Firm* — Young Basile Hanlon & MacFarlane, P.C.

(57) ABSTRACT

A method for predicting traffic light information by using a LIDAR is provided. The method includes steps of: (a) on condition that each of metadata has been allocated for each of virtual boxes included in a region covered by the LIDAR, obtaining, by a server, at least part of start timing information and stop timing information of a plurality of vehicles for each of the virtual boxes; and (b) predicting, by the server, each of pieces of the traffic light information respectively corresponding to each of the virtual boxes by referring to at least part of the start timing information and the stop timing information of the vehicles for each of the virtual boxes.

22 Claims, 9 Drawing Sheets

(56) References Cited

U.S. PATENT DOCUMENTS

| | | | |
|---|---|---|---|
| 11,462,022 B2 * | 10/2022 | Wellington | G05D 1/0088 |
| 11,473,917 B2 * | 10/2022 | Biala | G01C 21/3407 |
| 2016/0035223 A1 * | 2/2016 | Gutmann | B60W 30/18154 |
| | | | 340/907 |
| 2017/0262709 A1 * | 9/2017 | Wellington | G06F 18/22 |
| 2018/0012088 A1 * | 1/2018 | Matsuo | G06V 20/584 |
| 2018/0204077 A1 * | 7/2018 | Yamanoi | H04N 23/00 |
| 2018/0218226 A1 * | 8/2018 | Wellington | G06V 20/582 |
| 2020/0302196 A1 * | 9/2020 | Wellington | G05D 1/0088 |
| 2020/0408299 A1 * | 12/2020 | Jeon | B60W 30/14 |
| 2020/0410263 A1 * | 12/2020 | Gao | G06V 20/588 |
| 2021/0046936 A1 * | 2/2021 | Umeda | B60W 10/20 |
| 2021/0166145 A1 * | 6/2021 | Omari | G08G 1/163 |
| 2022/0153273 A1 * | 5/2022 | Metli | B60W 30/18154 |

FOREIGN PATENT DOCUMENTS

| | | | | |
|---|---|---|---|---|
| CN | 103500505 B | | 7/2015 | |
| CN | 103500505 B | * | 7/2015 | |
| CN | 103956057 B | * | 8/2016 | |
| CN | 106537271 A | * | 3/2017 | B60W 30/09 |
| CN | 110546696 A | * | 12/2019 | B60W 30/12 |
| CN | 111381673 A | * | 7/2020 | B60W 10/18 |
| CN | 112307642 A | * | 2/2021 | G06F 30/20 |
| CN | 113112830 A | * | 7/2021 | G01S 17/58 |
| CN | 113112830 A | | 7/2021 | |
| CN | 110033624 B | * | 8/2021 | B60W 30/16 |
| CN | 113112830 B | * | 12/2021 | G01S 17/58 |
| CN | 114694123 A | * | 7/2022 | |
| CN | 110546696 B | * | 8/2022 | B60W 30/12 |
| CN | 112307642 B | * | 9/2022 | G06F 30/20 |
| CN | 114694123 B | * | 9/2022 | |
| DE | 102014220681 A1 | * | 4/2015 | G01C 21/34 |
| DE | 102015204122 A1 | * | 11/2015 | B60K 35/00 |
| DE | 102017206847 B4 | * | 8/2020 | B60W 30/12 |
| DE | 112018007253 T5 | * | 12/2020 | B60W 10/20 |
| DE | 102019211098 B4 | * | 6/2021 | G06K 9/00825 |
| DE | 102021101758 A1 | * | 8/2021 | B60W 60/001 |
| DE | 102022000170 A1 | * | 3/2022 | |
| EP | 3324384 A1 | * | 5/2018 | B60W 40/04 |
| EP | 3324384 B1 | * | 3/2021 | B60W 40/04 |
| GB | 2592461 A | * | 9/2021 | B60W 60/001 |
| JP | 6477883 B2 | * | 3/2019 | B60W 40/04 |
| JP | 2020166675 A | * | 10/2020 | B60W 30/18154 |
| JP | 6916953 B2 | * | 8/2021 | B60W 10/20 |
| JP | 2022099000 A | * | 7/2022 | B60W 30/09 |
| JP | 2022102453 A | * | 7/2022 | B60Q 9/008 |
| WO | WO-2017009934 A1 | * | 1/2017 | B60W 40/04 |
| WO | WO-2021051870 A1 | * | 3/2021 | G06K 9/00825 |

* cited by examiner

METHOD FOR PREDICTING TRAFFIC LIGHT INFORMATION BY USING LIDAR AND SERVER USING THE SAME

CROSS-REFERENCE TO RELATED APPLICATION(S)

This application claims priority to Korean Patent Application Serial No. 10-2021-0126771, filed Sep. 24, 2021, the entire disclosure of which is hereby incorporated by reference.

TECHNICAL FIELD

The present disclosure relates to a method for predicting traffic light information by using LIDAR; and more particularly, to the method for predicting each of pieces of the traffic light information corresponding to each of virtual boxes by referring to at least part of start timing information and stop timing information of vehicles of each of the virtual boxes, and the server using the same.

BACKGROUND

LIDAR is a device which precisely illustrates the appearance of a surrounding target object by projecting a laser pulse into the surrounding target object, receiving the light reflected back from the surrounding target object, and thereby measuring the distance, etc. to the surrounding target object. The LIDAR is a compound word originated by mixing "light" and "radar". That is, the "LIDAR" means a radar which uses light instead of radio frequency, and it has a similar mechanism to a traditional radar, but the wavelength of the electromagnetic wave used therein is different, and thus the scope of usage may be different.

Recently, not only general motor vehicles but also various traffic subjects such as autonomous vehicles, motorcycles and electric scooters are appearing, and thus more developed form of a traffic infrastructure system reflecting such a reality becomes necessary.

However, there are not many cases of implementing the traffic infrastructure system which can acquire traffic data more accurately and quickly by using LIDAR, and even if there is, it is merely a technology of acquiring traffic data while driving a motor vehicle on which the LIDAR is mounted. For example, the cases of using the LIDAR in the traffic infrastructure system are mostly related to the LIDAR mounted on the motor vehicle, and while the motor vehicle is driving, surrounding target objects are detected and then warning is given to the driver in order to allow the driver to avoid them.

However, there is almost no technology that fixedly installs the LIDAR in places such as intersections and acquires and uses complicated traffic data of the intersections by using the LIDAR. That is, it is necessary to develop a method for accurately predicting each of pieces of the traffic light information by referring to trajectories of dynamic objects such as motor vehicles and pedestrians passing around the intersections acquired through the LIDAR.

SUMMARY

It is an object of the present disclosure to solve all the aforementioned problems.

It is another object of the present disclosure to recognize lane lines and vehicles in a region covered by a LIDAR and predict traffic light information by using start timing information and stop timing information of the vehicles.

It is still another object of the present disclosure to figure out movements of the vehicles in an intersection, to thereby predict a changing order of the traffic light information for each of the lane lines and duration times of the traffic light information.

In accordance with one aspect of the present disclosure, there is provided a method for predicting traffic light information by using a LIDAR, including steps of: (a) on condition that each of metadata has been allocated for each of virtual boxes included in a region covered by the LIDAR, obtaining, by a server, at least part of start timing information and stop timing information of a plurality of vehicles for each of the virtual boxes; and (b) predicting, by the server, each of pieces of the traffic light information respectively corresponding to each of the virtual boxes by referring to at least part of the start timing information and the stop timing information of the vehicles for each of the virtual boxes.

As one example, at the step of (b), on condition that a weight of the start timing information of the vehicles for each of the virtual boxes has been set as higher than a weight of the stop timing information thereof, the server predicts each of pieces of the traffic light information respectively corresponding to each of the virtual boxes.

As one example, in response to determining a first path or a first expected path of a first vehicle that started from a first virtual box to which a first metadata is allocated as being overlapped with at least part of a second path or a second expected path of a second vehicle that started from a second virtual box to which a second metadata is allocated, the server determines a specific traffic light information, among first traffic light information and second traffic light information, corresponding to a specific virtual box in which a specific vehicle is located, as having a higher priority than the other traffic light information among the first traffic light information and the second traffic light information, wherein the specific vehicle corresponds to specific start timing information having a higher reliability between first timing information of the first vehicle and second timing information of the second vehicle, in order to determine one with a higher priority between first prediction information for the first traffic light information corresponding to the first virtual box and second prediction information for the second traffic light information corresponding to the second virtual box.

As one example, the server calculates the reliability of the start timing information of the specific vehicle by referring to at least part of (i) information on whether a duration of the specific vehicle being stopped before starting from the specific virtual box is equal to or greater than a predetermined time and (ii) information on whether a velocity of the specific vehicle, before starting from the specific virtual box, being included in a predetermined velocity.

As one example, the server obtains the metadata allocated for each of the virtual boxes by using high-density map information or obtains the metadata allocated for each of the virtual boxes by using another map information, wherein the another map information is created by utilizing object information recognized by the LIDAR.

As one example, at the step of (b), the server continuously measures times between the start timing information and the stop timing information of the vehicles in each of the virtual boxes, and stores information on a changing order of the traffic light information corresponding to the virtual boxes and information on each of duration times of the traffic light information, to thereby predict each of pieces of the traffic light information respectively corresponding to each of the virtual boxes.

As one example, in response to detecting a vehicle of a size smaller than a predetermined size as a specific vehicle in a specific virtual box, at the step of (a), the server removes specific start timing information and specific stop timing information for the specific vehicle as noise for the specific virtual box, and at the step of (b), the server predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

As one example, at the step of (b), in response to determining an average coordinate point of a specific vehicle in a specific virtual box to be within a predetermined distance from a specific virtual box outside the specific virtual box, the server predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

As one example, at the step of (b), in response to detecting a movement of at least one specific vehicle at a predetermined speed or less in a specific virtual box and at a predetermined outer distance from the specific virtual box, the server predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

As one example, at the step of (b), in response to detecting a difference between a first heading degree of a specific virtual box obtained by referring to a specific metadata of the specific virtual box and a second heading degree obtained by referring to a movement of a specific vehicle in the specific virtual box being larger than a predetermined degree, the server predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

As one example, at the step of (b), in response to determining that at least one subsequent vehicle of a specific vehicle is moving at a speed less than a predetermined speed or is stopped inside a specific virtual box after a movement of the specific vehicle is detected inside the specific virtual box, the server predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

In accordance with another aspect of the present disclosure, there is provided a server for predicting traffic light information by using a LIDAR, including: at least one memory for storing instructions; and at least one process configured to execute the instructions; wherein the processor performs (I) on condition that each of metadata has been allocated for each of virtual boxes included in a region covered by the LIDAR, a process of obtaining at least part of start timing information and stop timing information of a plurality of vehicles for each of the virtual boxes; and (II) a process of predicting each of pieces of the traffic light information respectively corresponding to each of the virtual boxes by referring to at least part of the start timing information and the stop timing information of the vehicles for each of the virtual boxes.

As one example, at the process of (II), on condition that a weight of the start timing information of the vehicles for each of the virtual boxes has been set as higher than a weight of the stop timing information thereof, the processor predicts each of pieces of the traffic light information respectively corresponding to each of the virtual boxes.

As one example, in response to determining a first path or a first expected path of a first vehicle that started from a first virtual box to which a first metadata is allocated as being overlapped with at least part of a second path or a second expected path of a second vehicle that started from a second virtual box to which a second metadata is allocated, the processor determines a specific traffic light information, among first traffic light information and second traffic light information, corresponding to a specific virtual box in which a specific vehicle is located, as having a higher priority than the other traffic light information among the first traffic light information and the second traffic light information, wherein the specific vehicle corresponds to specific start timing information having a higher reliability between first timing information of the first vehicle and second timing information of the second vehicle, in order to determine one with a higher priority between first prediction information for the first traffic light information corresponding to the first virtual box and second prediction information for the second traffic light information corresponding to the second virtual box.

As one example, the processor calculates the reliability of the start timing information of the specific vehicle, by referring to at least part of (i) information on whether a duration of the specific vehicle being stopped before starting from the specific virtual box is equal to or greater than a predetermined time and (ii) information on whether a velocity of the specific vehicle, before starting from the specific virtual box, being included in a predetermined velocity.

As one example, the processor obtains the metadata allocated for each of the virtual boxes by using high-density map information or obtains the metadata allocated for each of the virtual boxes by using another map information, wherein the another map information is created by utilizing object information recognized by the LIDAR.

As one example, at the process of (II), the processor continuously measures times between the start timing and the stop timing information of the vehicles in each of the virtual boxes, and stores information on a changing order of the traffic light information corresponding to the virtual boxes and information on each of duration times of the traffic light information, to thereby predict each of pieces of the traffic light information respectively corresponding to each of the virtual boxes.

As one example, in response to detecting a vehicle of a size smaller than a predetermined size as a specific vehicle in a specific virtual box, at the process of (I), the processor removes a specific start timing information and specific stop timing information for the specific vehicle as noise for the specific virtual box, and at the process of (II), the processor predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

As one example, at the process of (II), in response to determining an average coordinate point of a specific vehicle in a specific virtual box to be within a predetermined distance from a specific virtual box outside the specific virtual box, the processor predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

As one example, at the process of (II), in response to detecting a movement of at least one specific vehicle at a predetermined speed or less in a specific virtual box and a predetermined outer distance from the specific virtual box, the processor predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

As one example, at the process of (II), in response to detecting a difference between a first heading degree of a specific virtual box obtained by referring to a specific metadata of the specific virtual box and a second heading degree obtained by referring to a movement of a specific vehicle in the specific virtual box being larger than a predetermined degree, the processor predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

As one example, at the process of (II), in response to determining that at least one subsequent vehicle of a specific vehicle is moving at a speed less than a predetermined speed or is stopped inside a specific virtual box after a movement of the specific vehicle is detected inside the specific virtual box, the processor predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Figure 1:
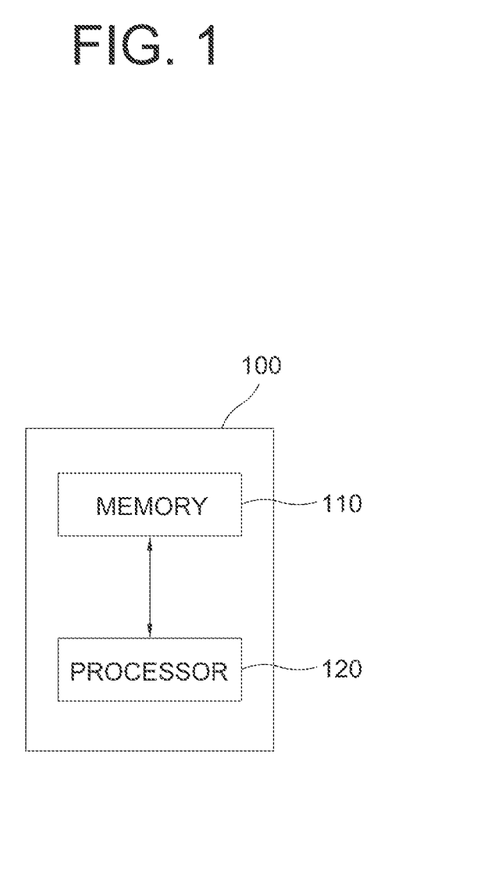
FIG. 1 is a drawing schematically illustrating a server for predicting traffic light information in accordance with the present invention.

FIG. 1 is a drawing schematically illustrating a server for predicting traffic light information in accordance with the present invention.

As illustrated in FIG. 1, a server 100 for predicting the traffic light information may include a memory 110 and a processor 120.

The memory 110 may store instructions to be performed by the processor 120, and specifically, the instructions are codes generated for the purpose of enabling the server 100 to function in a specific manner, and may be stored in a computer usable or computer readable memory which may direct to other data processing equipment programmable by computer. Instructions may perform processes for executing functions explained in the present disclosure.

In addition, a processor 120 of a server 100 may include hardware configuration of MPU (Micro Processing Unit) or CPU (Central Processing Unit), cache memory, data bus, etc. Additionally, any OS (operating system) and software configuration of applications that achieve specific purposes may be further included.

Moreover, a server 100 may be interlocked with a database (not shown). Herein, a database (not shown) may include, but are not limited to, storage media of at least one type media such as flash memory type, hard disk type, multimedia card micro type, memory of card type (for example, SD or XD memory), RAM (Random Access Memory), SRAM (Static Random Access Memory), ROM (Read-Only Memory), PROM (Programmable Read-Only Memory), magnetic memory, magnetic disk, optical disk, and all media capable of storing data. Moreover, a database (not shown) may be installed separately from a server 100, or otherwise may be installed inside a server 100 and transmit data or record received data, and may be implemented in separation into two or more unlike as illustrated, and this may vary depend on the working conditions.

As above, methods for predicting the traffic light information for each of lane lines in accordance with one example embodiment of the present invention are explained as follows with reference to FIG. 2 to FIG. 9.

Figure 2:
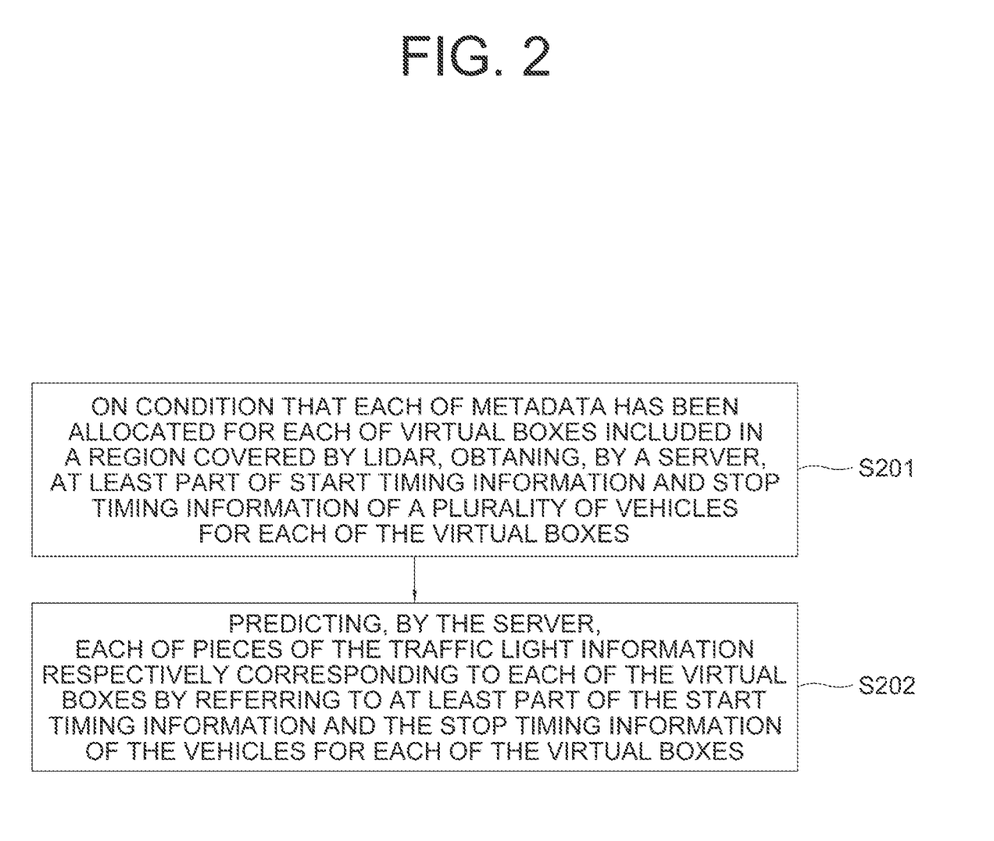
FIG. 2 is a drawing schematically illustrating a process for predicting each of pieces of the traffic light information corresponding to each of virtual boxes in accordance with one example embodiment of the present invention.

Firstly, FIG. 2 is a drawing schematically illustrating a process for predicting each of pieces of the traffic light information corresponding to each of virtual boxes in accordance with one example embodiment of the present invention.

Referring to FIG. 2, in a region covered by a LIDAR, after driving paths are estimated by continuously detecting vehicles for a specific time with the LIDAR, the processor 120 may estimate each of metadata corresponding to each of the virtual boxes set on each of lane lines, and obtain at least part of start timing information and stop timing information of a plurality of vehicles for each of the virtual boxes at a step of S201, and then the processor 120 may predict each of pieces of the traffic light information respectively corresponding to each of the virtual boxes by referring to at least part of the start timing information and the stop timing information of the vehicles for each of the virtual boxes.

Below, a method for reasonably performing prediction processes on each pieces of the traffic light information corresponding to each of the virtual boxes in accordance with one example embodiment of the present invention is more specifically explained.

Figure 3:
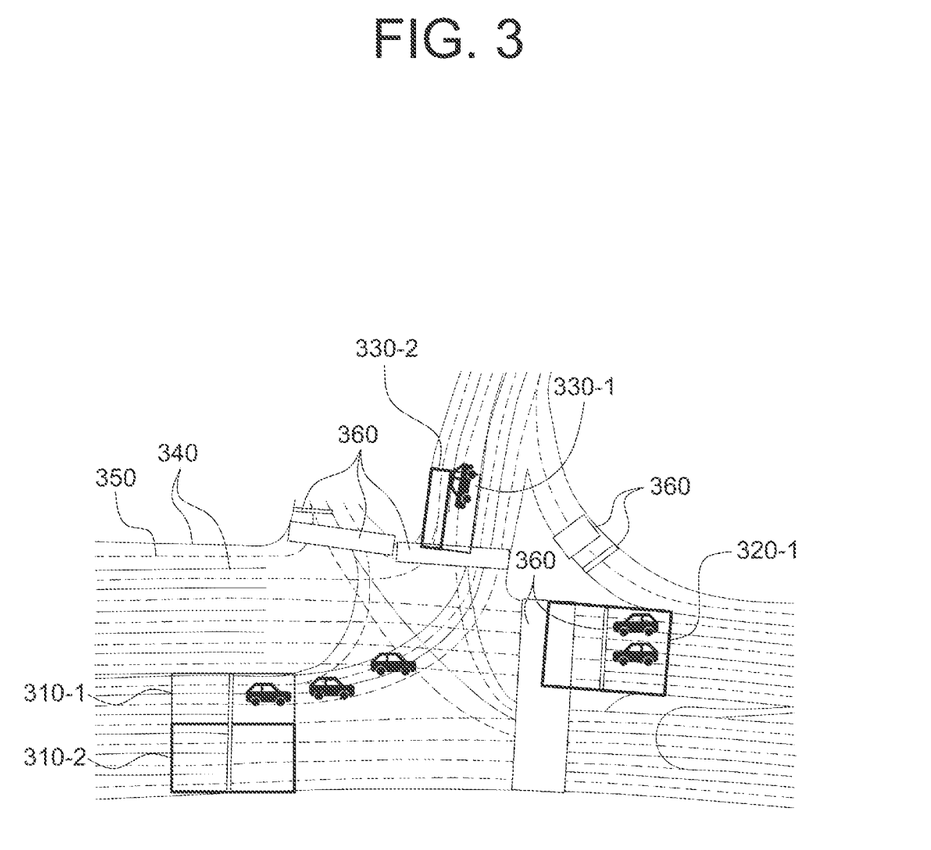
FIG. 3 is a drawing schematically illustrating processes of detecting lane lines, detecting stop lines and acquiring each of the virtual boxes for each of the lane lines through a LIDAR in accordance with one example embodiment of the present invention.

Firstly, FIG. 3 is a drawing schematically illustrating the steps of detecting lane lines, detecting stop lines and acquiring each of the virtual boxes for each of the lane lines through a LIDAR in accordance with one example embodiment of the present invention.

Referring to FIG. 3, in a region covered by the LIDAR, the server may measure trajectories 350 of a plurality of vehicles for a specific time, thereby predicting lane lines 340 to be on both sides of the trajectories 350 and predicting stop lines 360 by detecting places where the vehicles are stopped. Herein, only one of the trajectories are numbered as 350 for convenience in FIG. 3, but all of dotted lines should be understood as the trajectories. Moreover, two of the lane lines are numbered as 340 for convenience in FIG. 3, but all of solid lines should be understood as the lane lines.

Herein, the vehicles may include a car, a truck, an electric scooter, a bicycle or a motorcycle, etc.

Moreover, the trajectories 350 of the vehicles, the lane lines 340 and the stop lines 360 may be obtained from the result of detecting the movement of the vehicles for a specific time.

Moreover, in a region covered by the LIDAR, the server may make a plurality of virtual boxes 310-1, 310-2, 320-1, 330-1 and 330-2, allocate metadata to each of the virtual boxes 310-1, 310-2, 320-1, 330-1 and 330-2. Herein, the metadata may represent attributes of the virtual boxes such as left turn, go straight, right turn or U-turn. For each of the virtual boxes, the server may obtain and store the start timing information and the stop timing information for the vehicles. Herein, the weight of the start timing information of the vehicles may be set higher than the weight of the stop timing information thereof, because a timing of a vehicle starting is more constant and accurate than a timing of a vehicle stopping.

In addition, the process 120 may obtain the metadata allocated for each of the virtual boxes 310-1, 310-2, 320-1, 330-1 and 330-2 by using high-density map information, or obtain the metadata allocated for each of the virtual boxes 310-1, 310-2, 320-1, 330-1 and 330-2 by using another map information. Herein said another map information is created by utilizing object information recognized by the LIDAR.

Figure 4:
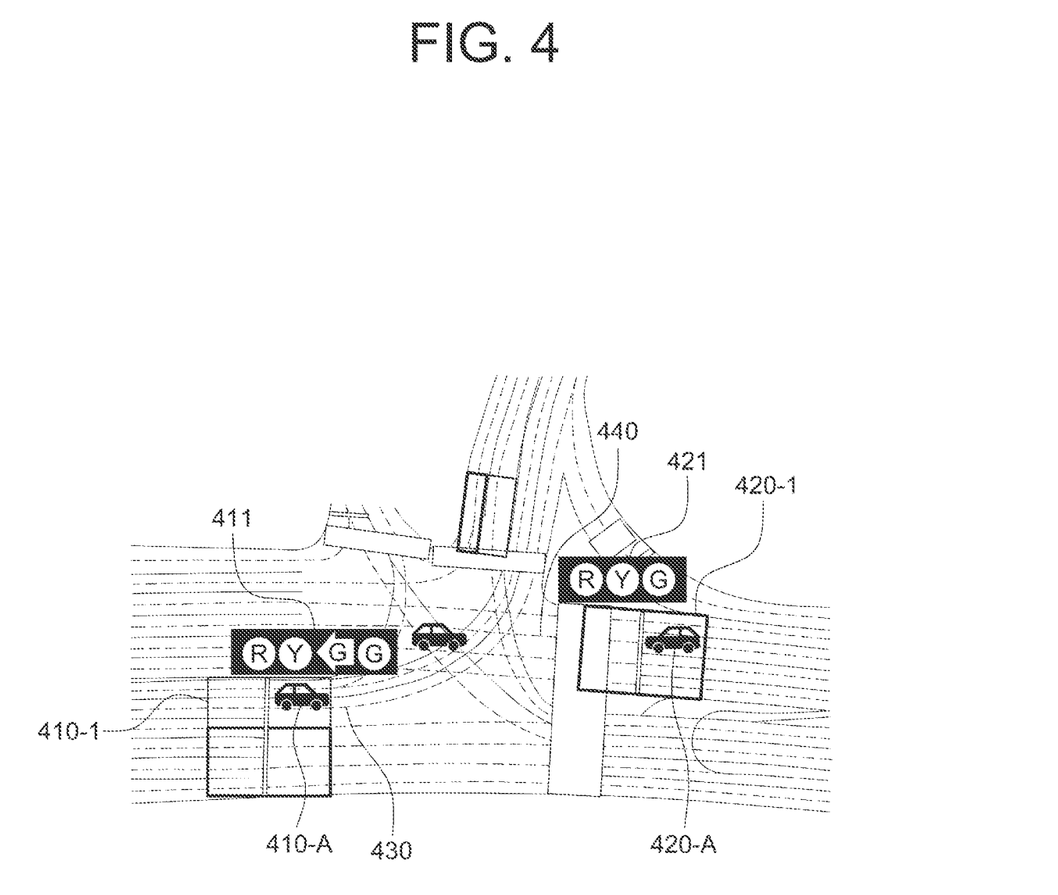
FIG. 4 is a drawing schematically illustrating processes of determining a priority of the traffic light information based on the detected lane lines and the virtual boxes in accordance with one example embodiment of the present invention.

Next, FIG. 4 is a drawing schematically illustrating processes of determining a priority of the traffic light information based on the detected lane lines and the virtual boxes in accordance with one example embodiment of the present invention.

Referring to FIG. 4, in response to determining a first path 430 or a first expected path 430 of a first vehicle 410-A that started from a first virtual box 410-1 to which a first metadata is allocated as being overlapped with at least part of a second path 440 or a second expected path 440 of a second vehicle 420-A that started from a second virtual box 420-1 to which a second metadata is allocated, the processor 120 may determine specific traffic light information, among first traffic light information 411 and second traffic light information 421, corresponding to a specific virtual box in which a specific vehicle is located, as having a higher priority than the other traffic light information among the first traffic light information 411 and the second traffic light information 421, wherein the specific vehicle corresponds to specific start timing information having a higher reliability between first start timing information of the first vehicle 410-A and second start timing information of the second vehicle 420-A, in order to determine one with a higher priority between first prediction information for the first traffic light information 411 corresponding to the first virtual box 410-1 and second prediction information for the second traffic light information 421 corresponding to the second virtual box 420-1.

Herein, in order to determine the specific start timing information with a higher reliability, the processor may calculate each reliability of each of pieces of the start timing information corresponding to each of the vehicles in each of the virtual boxes by referring to at least part of (i) information on whether a duration of each of the vehicles 410-A, 420-A being stopped before starting from each of the virtual boxes 410-1, 420-1 is equal to or greater than a predetermined time and (ii) information on whether each moving state of each of the vehicles in each of the virtual boxes 410-1, 420-1 is included in a predetermined range of velocity.

As one example, in case a duration of the first vehicle 410-A stopping in the first virtual box 410-1 before starting from the first virtual box 410-1 along a left turn lane line 430 is 30 seconds and a duration of the second vehicle 420-A stopping in the second virtual box 420-1 before starting from the second virtual box 420-1 along a straight lane line 440 is merely 1 second, the reliability of the start timing information of the first vehicle 410-A moving along the left turn lane line 430 from the first virtual box 410-1 may be determined as higher than the reliability of the start timing information of the second vehicle 420-A moving along the straight lane line 440 from the second virtual box 420-1. This is because, in the case of the latter, the second vehicle 420-A is more likely to be a vehicle ignoring a traffic signal in a rush.

As another example, in case a starting velocity of the first vehicle 410-A starting from the first virtual box 410-1 increases from 0 m/s to 20 m/s, and a starting velocity of the second vehicle 420-A starting from the second virtual box 420-1 increases from 50 m/s to 60 m/s, the reliability of the start timing information of the first vehicle 410-A which is included in the predetermined range of velocity (for example, a range of 0 m/s to 30 m/s) may be determined as higher. This is because, in the case of the latter, the second vehicle 420-A is more likely to be a vehicle ignoring a traffic signal in a rush.

As another example, as a logic to determine whether a vehicle starts or not, a system internally may track the first vehicle 410-A and the second vehicle 420-A, etc. every predetermined time unit, for example, every 0.1 m sec.

Figure 5:
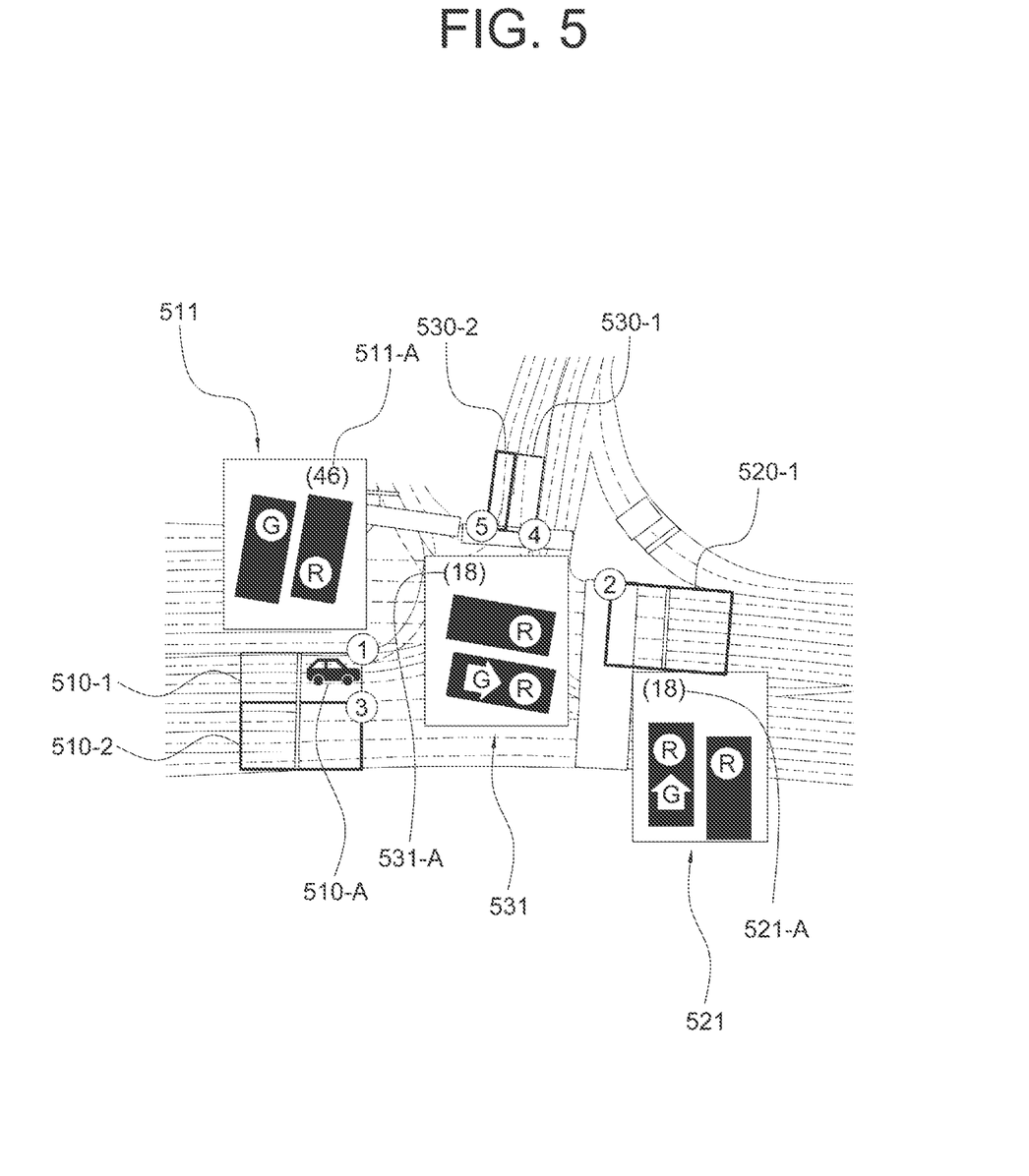
FIG. 5 is a drawing schematically illustrating processes of predicting each duration of each of pieces of the traffic light information corresponding to each of the virtual boxes in accordance with one example embodiment of the present invention.

Next, FIG. 5 is a drawing schematically illustrating processes of predicting each duration of each of pieces of the traffic light information corresponding to each of the virtual boxes in accordance with one example embodiment of the present invention.

Referring to FIG. 5, the processor 120 continuously (i) measures times between the start timing information and the stop timing information of vehicles in each of virtual boxes 510-1, 510-2, 520-1, 530-1, 530-2, and (ii) stores information on a changing order ①, ②, ③, ④, ⑤ of traffic lights 511, 521, 531 corresponding to the virtual boxes 510-1, 510-2, 520-1, 530-1, 530-2 and information on each of duration times 511-A, 521-A, 531-A of the traffic lights 511, 521, 531, to thereby predict each of the traffic lights 511, 521, 531 information respectively corresponding to each of the virtual boxes 510-1, 510-2, 520-1, 530-1, 530-2.

As one example, in case a first vehicle 510-A is stopped in the first virtual box 510-1, to which metadata having the information of the right turn lane line is allocated, the processor may predict that the first traffic signal 511 has changed to a driving signal by referring to the start timing information of the first vehicle 510-A which started from the first virtual box 510-1, and may predict that the first traffic signal 511 has changed to a stop signal, etc. by referring to the stop timing information of the last following vehicle which stopped at the first virtual box 510-1 after continuously monitoring other following vehicles entering the first virtual box 510-1 subsequent to the first vehicle 510-A. Herein, considering that the reliability of the stop timing information of the last following vehicle may be rather low, the processor may accurately predict a timing that the first traffic signal 511 changes to the stop signal, etc. by referring to the start timing information of other vehicles corresponding to other traffic lights (which may be one or more traffic lights changing to the driving signal when the first traffic light is changing to the stop signal) associated with other lane lines. This is because each traffic signal is controlled by interlocking with each other.

Figure 6:
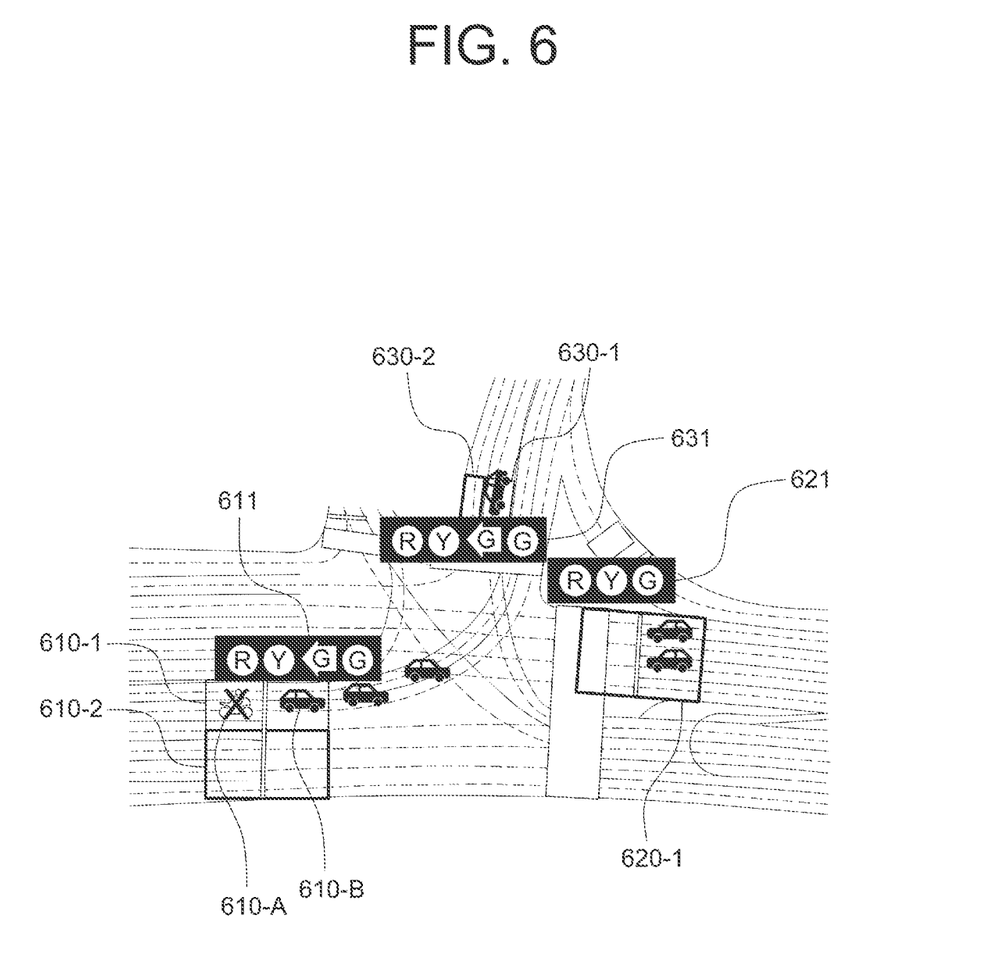
FIG. 6 is a drawing schematically illustrating processes of detecting a size of a vehicle in a virtual box in accordance with one example embodiment of the present invention.

Next, FIG. 6 is a drawing schematically illustrating processes of detecting a size of a vehicle in a virtual box in accordance with one example embodiment of the present invention.

Referring to FIG. 6, as one example, in response to detecting a vehicle 610-A of a size smaller than a predetermined size as stored in the processor 120, the processor 120 removes the vehicle 610-A of a size smaller than the predetermined size as noise, and predicts each of pieces of the traffic light information 611, 621, 631 respectively corresponding to each of the virtual boxes 610-1, 610-2, 620-1, 630-1, 630-2 by referring to the start timing information and the stop timing information of at least one remaining vehicle 610-B.

Herein, the vehicle of a size smaller than the predetermined size stored in the processor 120 may be a motorcycle, a bicycle, or an electric scooter, etc. This is because the motorcycle, the bicycle or the electric scooter have high probabilities of violating traffic laws and regulations by ignoring signals or lane lines compared to a car or a truck, etc.

Figure 7:
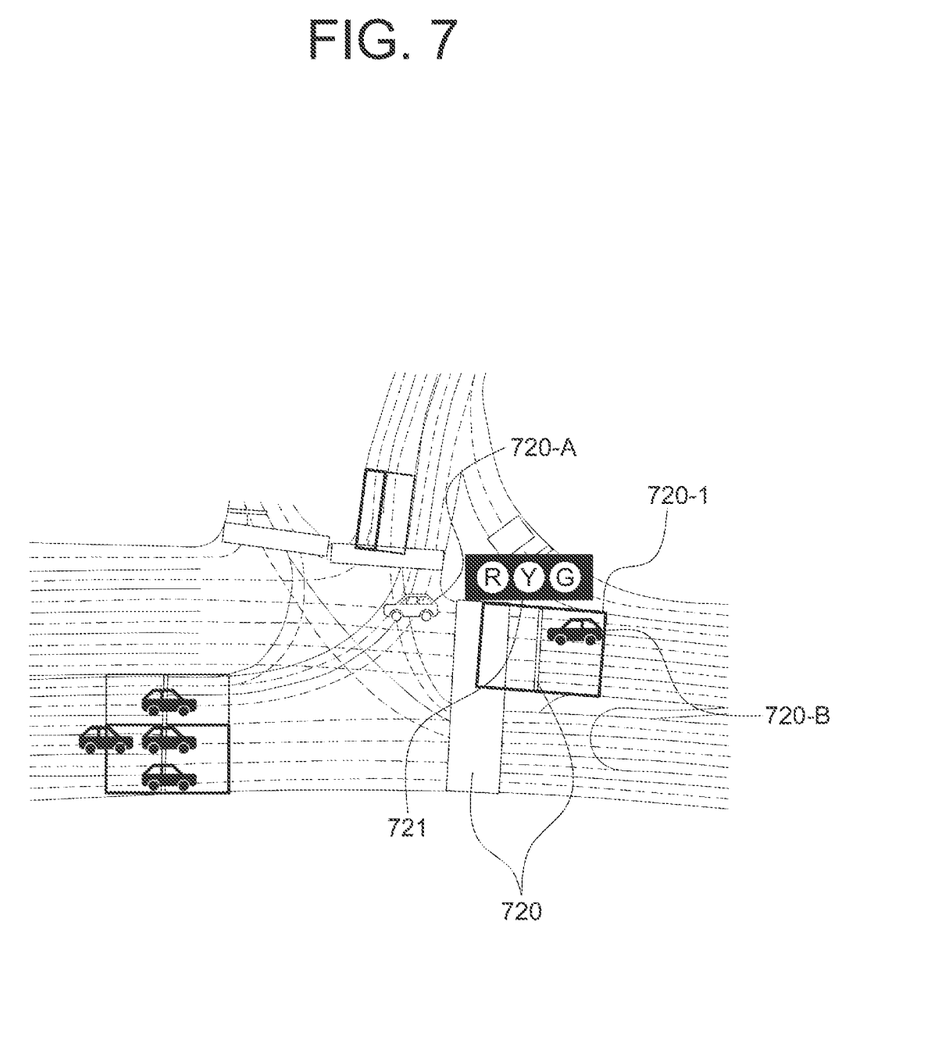
FIG. 7 is a drawing schematically illustrating a method for predicting the traffic light information by removing specific start timing information and specific stop timing information for a specific vehicle stopped outside a specific virtual box as noise for the specific virtual box.

Next, FIG. 7 is a drawing schematically illustrating a method for predicting the traffic light information by removing specific start timing information and specific stop timing information for a specific vehicle stopped outside a specific virtual box as noise for the specific virtual box.

That is, the traffic light information corresponding to the specific virtual box is predicted by referring to remaining start timing information and remaining stop timing information related to the specific virtual box. Herein, the remaining start timing information and the remaining stop timing information are acquired by removing the specific start timing information and the specific stop timing information from all the start timing information and the stop timing information related to the specific virtual box.

Referring to FIG. 7, as one example, on condition that a location of a first vehicle 720-A is 10 m away from a first virtual box 720-1, the processor 120 may remove the first vehicle 720-A since the first vehicle 720-A may be considered as incorrectly stopped outside the stop line 720, or suddenly caught at a traffic signal, and then predict the traffic signal information 721 by referring to the start timing information and the stop timing information of the remaining vehicle 720-B in the first virtual box 720-1.

Figure 8:
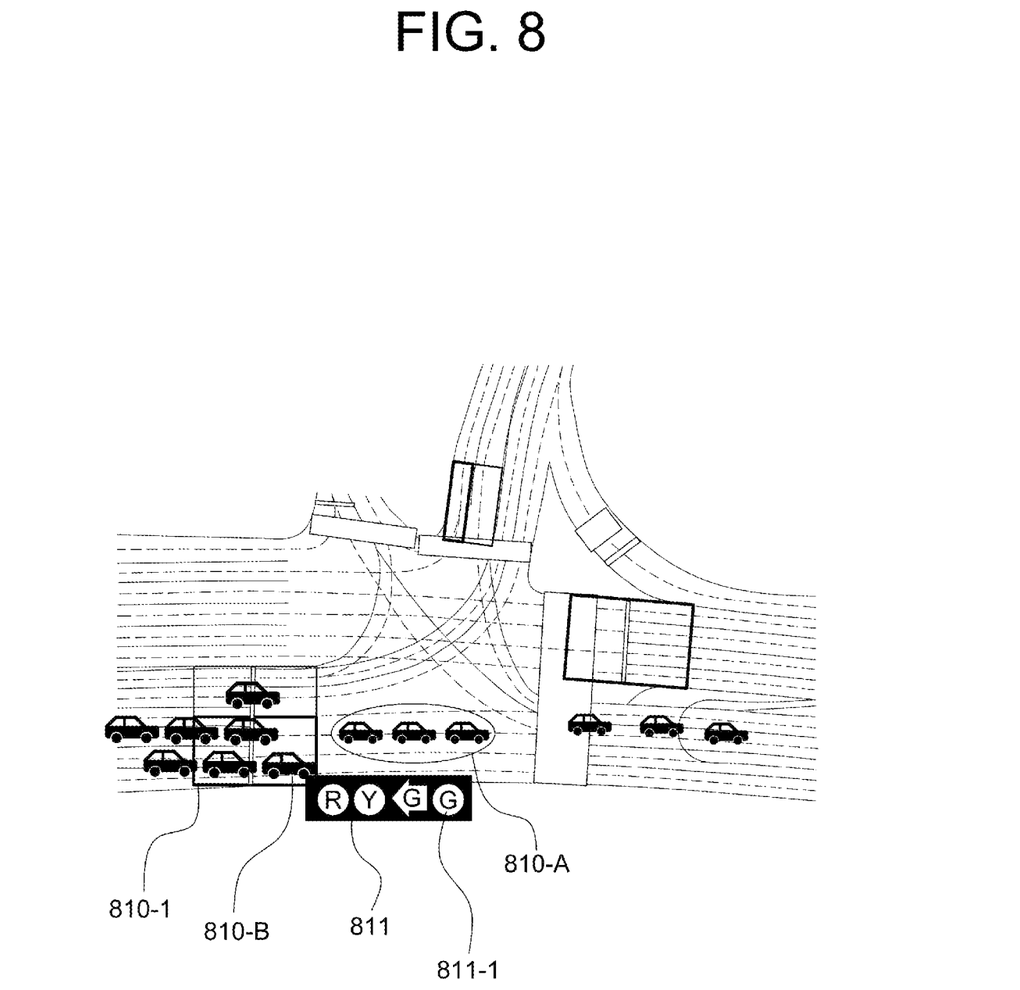
FIG. 8 is a drawing schematically illustrating a method for predicting the traffic light information by removing specific start timing information and specific stop timing information for multiple vehicles driving at a velocity equal to or less than a predetermined velocity at a predetermined outside distance as noise for the specific virtual box.

Next, FIG. 8 is a drawing schematically illustrating a method for predicting the traffic light information by removing specific start timing information and specific stop timing information for multiple vehicles driving at a velocity equal to or less than a predetermined velocity at a predetermined outside distance as noise for the specific virtual box.

That is, the traffic light information corresponding to the specific virtual box is predicted by referring to the remaining start timing information and the remaining stop timing information related to the specific virtual box. Herein, the remaining start timing information and the remaining stop timing information are acquired by removing the specific start timing information and the specific stop timing information from all the start timing information and the stop timing information related to the specific virtual box.

Referring to FIG. 8, as one example, in case movements of one or more vehicles 810-A are detected at a velocity equal to or less than the predetermined velocity of 10 m/s in a region 5 m away from a first virtual box 810-1, the processor 120 may remove the vehicles 810-A since the vehicles 810-A may be considered as being in a traffic jam.

In addition, the processor 120 may remove the noise above and predict the traffic light information 811 by referring to the start timing information and the stop timing information of the remaining vehicles, e.g., second vehicles 810-B. But, as another case, the second vehicles 810-B can also be removed as a noise.

Figure 9:
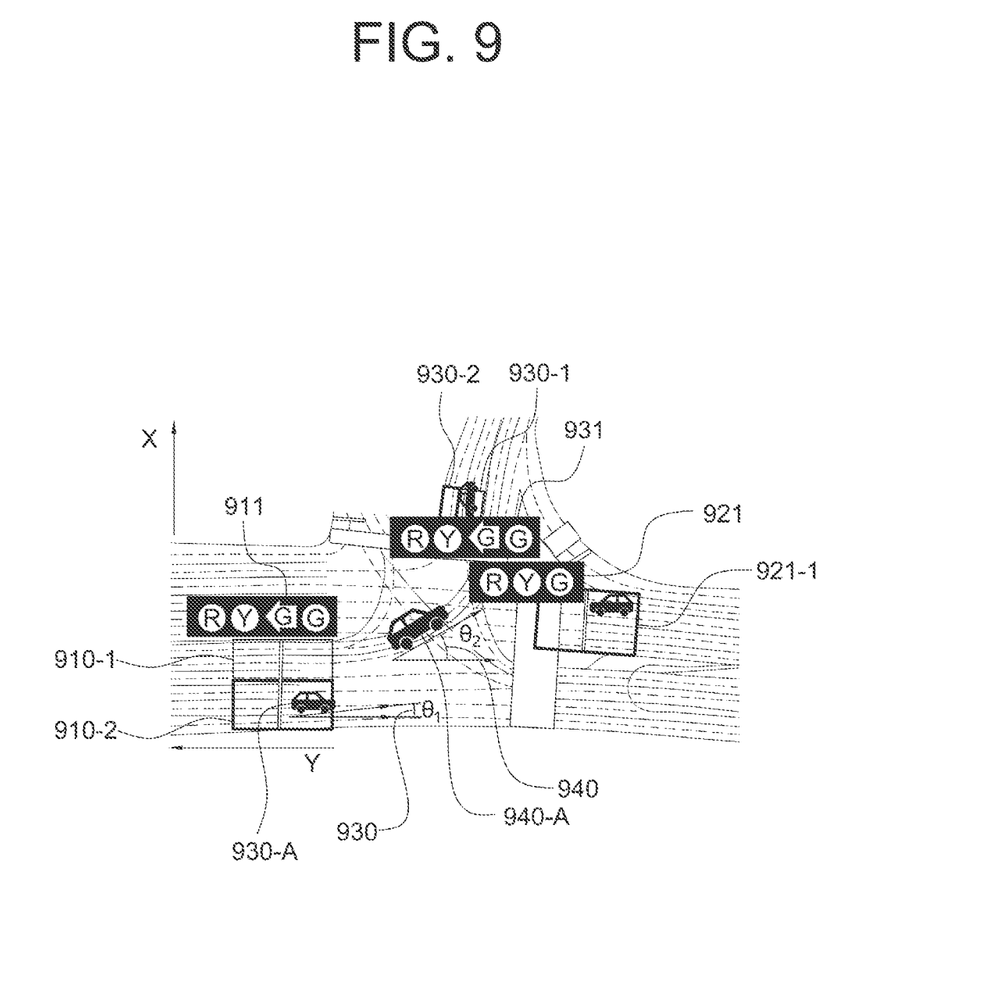
FIG. 9 is a drawing schematically illustrating a method for predicting the traffic light information by removing specific start timing information and specific stop timing information for a specific vehicle with a moving angle being apart from a metadata of the specific virtual box.

Next, FIG. 9 is a drawing schematically illustrating a method for predicting the traffic light information by removing specific start timing information and specific stop timing information for a specific vehicle with a moving angle being apart from a metadata of the specific virtual box.

Referring to FIG. 9, as one example, the processor 120 may remove a case where a difference between an angle 930 of the straight line and a moving angle of a first vehicle 940-A turning left exceeds a predetermined threshold, e.g., 20 degrees or more, by referring to the metadata of a first virtual box 910-2, and predict each of pieces of the traffic light information 911, 921, 931 corresponding to each of the virtual boxes 910-1, 910-2, 920-1, 930-1, 930-2 by referring to the start timing information and the stop timing information of remaining vehicles 930-A going through the first virtual box 910-2.

In addition, although not illustrated, in response to determining that at least one subsequent vehicle of a specific vehicle is moving at a speed less than a predetermined speed or is stopped inside a specific virtual box after a movement of the specific vehicle is detected inside the specific virtual box, the processor 120 may predict each of pieces of the traffic light information respectively corresponding to each of the virtual boxes by referring to the remaining start timing information and the remaining stop timing information. Herein the remaining start timing information and the remaining stop timing information are acquired by removing the specific start timing information and the specific stop timing information from all the start timing information and the stop timing information.

The present disclosure has an effect of recognizing the lane lines and vehicles in the region that can be covered by LIDAR and predicting the traffic light information by using the start timing information and the stop timing information of vehicles.

The present disclosure has another effect of figuring out the movement of the vehicles in the intersection, to thereby predict the changing order of the traffic lights and the duration of the traffic lights.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for predicting traffic light information by using a LIDAR, comprising steps of:
    (a) on condition that each of metadata has been allocated for each of virtual boxes included in a region covered by the LIDAR, obtaining, by a server, at least part of start timing information and stop timing information of a plurality of vehicles for each of the virtual boxes; and
    (b) predicting, by the server, each of pieces of the traffic light information respectively corresponding to each of the virtual boxes by referring to at least part of the start timing information and the stop timing information of the vehicles for each of the virtual boxes.

2. The method of claim 1, wherein, at the step of (b), on condition that a weight of the start timing information of the vehicles for each of the virtual boxes has been set as higher than a weight of the stop timing information thereof, the server predicts each of pieces of the traffic light information respectively corresponding to each of the virtual boxes.

3. The method of claim 1, wherein, in response to determining a first path or a first expected path of a first vehicle that started from a first virtual box to which a first metadata is allocated as being overlapped with at least part of a second path or a second expected path of a second vehicle that started from a second virtual box to which a second metadata is allocated, the server determines a specific traffic light information, among first traffic light information and second traffic light information, corresponding to a specific virtual box in which a specific vehicle is located, as having a higher priority than the other traffic light information among the first traffic light information and the second traffic light information, wherein the specific vehicle corresponds to specific start timing information having a higher reliability between first timing information of the first vehicle and second timing information of the second vehicle, in order to determine one with a higher priority between first prediction information for the first traffic light information corresponding to the first virtual box and second prediction information for the second traffic light information corresponding to the second virtual box.

4. The method of claim 3, wherein the server calculates the reliability of the start timing information of the specific vehicle by referring to at least part of (i) information on whether a duration of the specific vehicle being stopped before starting from the specific virtual box is equal to or greater than a predetermined time and (ii) information on whether a velocity of the specific vehicle, before starting from the specific virtual box, is included in a predetermined velocity.

5. The method of claim 1, wherein the server obtains the metadata allocated for each of the virtual boxes by using high-density map information or obtains the metadata allocated for each of the virtual boxes by using another map information, wherein the another map information is created by utilizing object information recognized by the LIDAR.

6. The method of claim 1, wherein, at the step of (b), the server continuously measures times between the start timing information and the stop timing information of the vehicles in each of the virtual boxes, and stores information on a changing order of the traffic light information corresponding to the virtual boxes and information on each of duration times of the traffic light information, to thereby predict each of pieces of the traffic light information respectively corresponding to each of the virtual boxes.

7. The method of claim 1, wherein, in response to detecting a vehicle of a size smaller than a predetermined size as a specific vehicle in a specific virtual box, at the step of (a), the server removes specific start timing information and specific stop timing information for the specific vehicle as noise for the specific virtual box, and at the step of (b), the server predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

8. The method of claim 1, wherein, at the step of (b), in response to determining an average coordinate point of a specific vehicle in a specific virtual box to be within a predetermined distance from a specific virtual box outside the specific virtual box, the server predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

9. The method of claim 1, wherein, at the step of (b), in response to detecting a movement of at least one specific vehicle at a predetermined speed or less in a specific virtual box and at a predetermined outer distance from the specific virtual box, the server predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

10. The method of claim 1, wherein, at the step of (b), in response to detecting a difference between a first heading degree of a specific virtual box obtained by referring to a specific metadata of the specific virtual box and a second heading degree obtained by referring to a movement of a specific vehicle in the specific virtual box being larger than a predetermined degree, the server predicts each of pieces of the traffic light information respectively corresponding to each of the virtual boxes by referring to remaining start timing information and remaining stop timing information, wherein the remaining start timing information and the remaining stop timing information are acquired by removing specific start timing information and specific stop timing information from all the start timing information and the stop timing information.

11. The method of claim 1, wherein, at the step of (b), in response to determining that at least one subsequent vehicle of a specific vehicle is moving at a speed less than a predetermined speed or is stopped inside a specific virtual box after a movement of the specific vehicle is detected inside the specific virtual box, the server predicts each of pieces of the traffic light information respectively corresponding to each of the virtual boxes by referring to remaining start timing information and remaining stop timing information, wherein the remaining start timing information and the remaining stop timing information are acquired by removing specific start timing information and specific stop timing information from all the start timing information and the stop timing information.

12. A server for predicting traffic light information by using a LIDAR, comprising:
   at least one memory for storing instructions; and
   at least one processor configured to execute the instructions,
   wherein the processor performs (I) on condition that each of metadata has been allocated for each of virtual boxes included in a region covered by the LIDAR, a process of obtaining at least part of start timing information and stop timing information of a plurality of vehicles for each of the virtual boxes; and (II) a process of predicting each of pieces of the traffic light information respectively corresponding to each of the virtual boxes by referring to at least part of the start timing information and the stop timing information of the vehicles for each of the virtual boxes.

13. The server of claim 12, wherein, at the process of (II), on condition that a weight of the start timing information of the vehicles for each of the virtual boxes has been set as higher than a weight of the stop timing information thereof, the processor predicts each of pieces of the traffic light information respectively corresponding to each of the virtual boxes.

14. The server of claim 12, wherein, in response to determining a first path or a first expected path of a first vehicle that started from a first virtual box to which a first metadata is allocated as being overlapped with at least part of a second path or a second expected path of a second vehicle that started from a second virtual box to which a second metadata is allocated, the processor determines a specific traffic light information, among first traffic light information and second traffic light information, corresponding to a specific virtual box in which a specific vehicle is located, as having a higher priority than the other traffic light information among the first traffic light information and the second traffic light information, wherein the specific vehicle corresponds to specific start timing information having a higher reliability between first timing information of the first vehicle and second timing information of the second vehicle, in order to determine one with a higher priority between first prediction information for the first traffic light information corresponding to the first virtual box and second prediction information for the second traffic light information corresponding to the second virtual box.

15. The server of claim 14, wherein the processor calculates the reliability of the start timing information of the specific vehicle, by referring to at least part of (i) information on whether a duration of the specific vehicle being stopped before starting from the specific virtual box is equal to or greater than a predetermined time and (ii) information on whether a velocity of the specific vehicle, before starting from the specific virtual box, is included in a predetermined velocity.

16. The server of claim 12, wherein the processor obtains the metadata allocated for each of the virtual boxes by using high-density map information or obtains the metadata allocated for each of the virtual boxes by using another map information, wherein the another map information is created by utilizing object information recognized by the LIDAR.

17. The server of claim 12, wherein, at the process of (II), the processor continuously measures times between the start timing information and the stop timing information of the vehicles in each of the virtual boxes, and stores information on a changing order of the traffic light information corresponding to the virtual boxes and information on each of duration times of the traffic light information, to thereby predict each of pieces of the traffic light information respectively corresponding to each of the virtual boxes.

18. The server of claim 12, wherein, in response to detecting a vehicle of a size smaller than a predetermined size as a specific vehicle in a specific virtual box, at the process of (I), the processor removes a specific start timing information and specific stop timing information for the specific vehicle as noise for the specific virtual box, and at the process of (II), the processor predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

19. The server of claim 12, wherein, at the process of (II), in response to determining an average coordinate point of a specific vehicle in a specific virtual box to be within a predetermined distance from a specific virtual box outside the specific virtual box, the processor predicts each of pieces of the traffic light information respectively corresponding to each of the virtual boxes by referring to remaining start timing information and remaining stop timing information, wherein the remaining start timing information and the remaining stop timing information are acquired by removing the specific start timing information and the specific stop timing information from all the start timing information and the stop timing information.

20. The server of claim 12, wherein, at the process of (II), in response to detecting a movement of at least one specific vehicle at a predetermined speed or less in a specific virtual box and a predetermined outer distance from the specific virtual box, the processor predicts each of pieces of the traffic light information respectively corresponding to each of the virtual boxes by referring to remaining start timing information and remaining stop timing information, wherein the remaining start timing information and the remaining stop timing information are acquired by removing specific start timing information and specific stop timing information from all the start timing information and the stop timing information.

21. The server of claim 12, wherein, at the process of (II), in response to detecting a difference between a first heading degree of a specific virtual box obtained by referring to a specific metadata of the specific virtual box and a second heading degree obtained by referring to a movement of a specific vehicle in the specific virtual box being larger than a predetermined degree, the processor predicts each of pieces of the traffic light information respectively corresponding to each of the virtual boxes by referring to remaining start timing information and remaining stop timing information, wherein the remaining start timing information and the remaining stop timing information are acquired by removing specific start timing information and specific stop timing information from all the start timing information and the stop timing information.

22. The server of claim 12, wherein, at the process of (II), in response to determining that at least one subsequent vehicle of a specific vehicle is moving at a speed less than a predetermined speed or is stopped inside a specific virtual box after a movement of the specific vehicle is detected inside the specific virtual box, the processor predicts each of pieces of the traffic light information respectively corresponding to each of the virtual boxes by referring to remaining start timing information and remaining stop timing information, wherein the remaining start timing information and the remaining stop timing information are acquired by removing specific start timing information and specific stop timing information from all the start timing information and the stop timing information.

* * * * *